United States Patent [19]

Grünewald et al.

[11] Patent Number: 4,834,781
[45] Date of Patent: May 30, 1989

[54] PROCESS FOR TREATING CO₂-CONTAINING ABSORBENT SOLUTION

[75] Inventors: Gerhard Grünewald, Mainz-Gonsenheim; Hans Kammerer, Frankfurt, both of Fed. Rep. of Germany

[73] Assignees: Metallgesellschaft AG, Frankfurt am Main, Fed. Rep. of Germany; Linde AG, Hollriegelskreuth, both of Fed. Rep. of Germany

[21] Appl. No.: 167,559

[22] Filed: Mar. 14, 1988

[30] Foreign Application Priority Data

Mar. 28, 1987 [DE] Fed. Rep. of Germany ....... 3710360

[51] Int. Cl.⁴ ............................................ B01D 53/14
[52] U.S. Cl. ........................................... 55/44; 55/48; 55/51; 55/68; 55/73
[58] Field of Search ................... 55/44, 48, 51, 53, 68, 55/73, 89; 423/223, 228, 229

[56] References Cited

U.S. PATENT DOCUMENTS

| | | | |
|---|---|---|---|
| 2,388,102 | 10/1945 | West | 55/51 X |
| 2,504,429 | 4/1950 | Latchum, Jr. | 55/51 X |
| 2,685,941 | 8/1954 | Kassel | 55/44 |
| 3,219,051 | 11/1965 | Francis | 55/48 X |
| 3,225,519 | 12/1965 | Stotler | 55/51 X |
| 3,505,784 | 4/1970 | Hochgesand et al. | 55/68 X |
| 3,531,917 | 10/1970 | Grünewald et al. | 55/73 X |
| 3,710,546 | 1/1973 | Grünewald et al. | 55/73 X |
| 3,824,766 | 7/1974 | Valentine et al. | 55/68 X |
| 3,880,615 | 4/1975 | Grünewald et al. | 55/68 X |
| 3,910,777 | 10/1975 | Jakob | 55/68 X |
| 4,325,782 | 4/1982 | Grünewald et al. | 55/68 X |
| 4,336,044 | 6/1982 | Barker et al. | 55/68 X |
| 4,609,384 | 9/1986 | Ranke et al. | 55/73 X |
| 4,702,750 | 10/1987 | Becker | 55/73 X |

FOREIGN PATENT DOCUMENTS 1494806 7/1975 Fed. Rep. of Germany .
1196658 7/1970 United Kingdom .

Primary Examiner—Robert Spitzer
Attorney, Agent, or Firm—Herbert Dubno; Jonathan Myers

[57] ABSTRACT

A gas which contains $CO_2$ and at least one of the valuable gases methane, hydrogen or carbon monoxide is purified by means of an absorbent solution in a scrubbing zone under a pressure of at least 5 bars. The laden absorbent solution has absorbed $CO_2$ and at least one of the valuable gases by physical dissolution. For a recovery of the valuable gas or gases, the laden absorbent solution is pressure-relieved to an intermediate pressure in the stripping zone and is stripped in the stripping zone with a gas which predominantly consists of $CO_2$. A gas mixture which contains a valuable gas is withdrawn from the stripping zone. The absorbent solution is pressure-relieved further in a succeeding pressure-relief zone, from which a flashed-off gas consisting predominantly of $CO_2$ is withdrawn. The laden absorbent solution is pressure-relieved to a first intermediate pressure in a pressure-relief zone which precedes the stripping zone and the laden absorbent solution is then supplied to the stripping zone. The gas which has been flashed off in the succeeding pressure-relief zone may be fed to the stripping zone as a stripping gas.

5 Claims, 1 Drawing Sheet

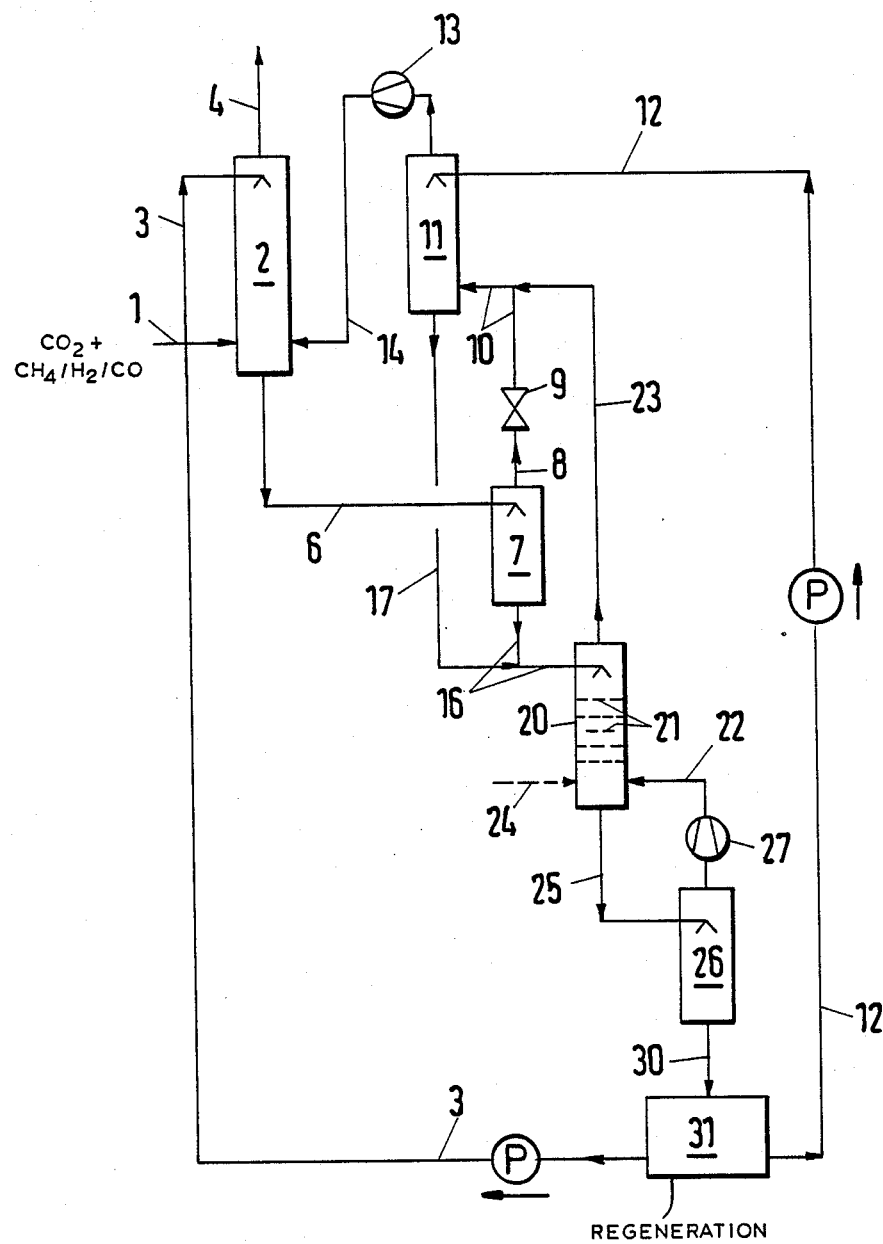

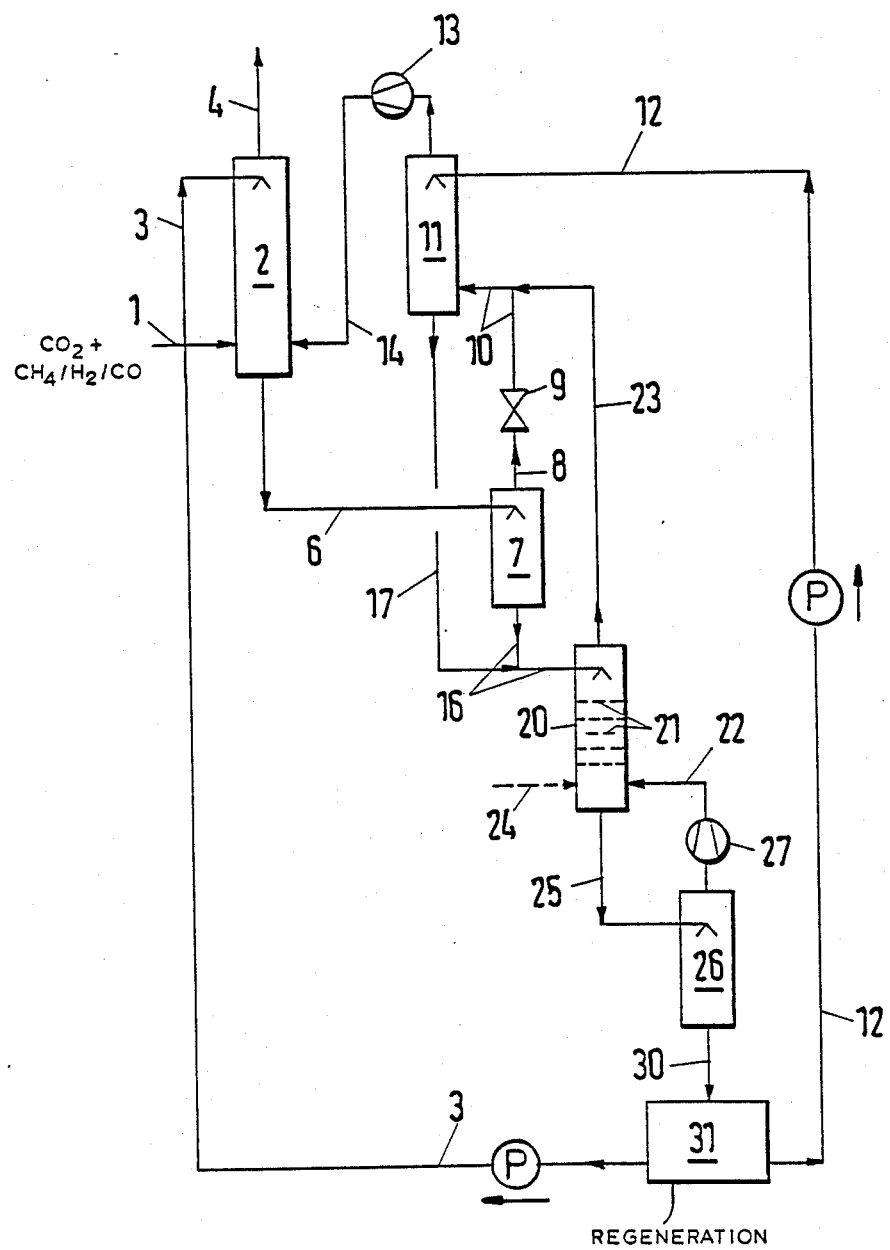

PROCESS FOR TREATING CO$_2$-CONTAINING ABSORBENT SOLUTION

FIELD OF THE INVENTION

Our present invention relates to a process for treating a laden absorbent solution, which in a scrubbing zone under a pressure of at least 5 bar has been in direct contact with a gas which is to be purified and contains CO$_2$ and at least one of the valuable gases methane, hydrogen or carbon monoxide and, as a result of such contact, the absorbent solution has absorbed CO$_2$ and at least one of the valuable gases by physical dissolution.

BACKGROUND OF THE INVENTION

The purification of gases by means of physically acting absorbent solutions and, particularly, the removal of CO$_2$ and H$_2$S from gases has been known for a long time. Processes of this kind have been described in the German Pat. No. 1,494,806 and in U.S. Pats. Nos. 3,531,917 and 3,710,546.

It is also known to regenerate the laden absorbent solution by a pressure relief, heating or stripping treatment or by a combination of such treatments.

Physically acting absorbent solutions which can be employed include particularly methanol or N-methylpyrrolidone (NMP). The gas scrubbers are usually operated at temperatures in the range of $+60°$ to $-80°$ C.

In scrubbing the gas, the absorbent solution absorbs not only impurities but also certain quantities of valuable gases.

OBJECTS OF THE INVENTION

Therefore, it is an object of our invention to recover at least part of said valuable gases from the laden absorbent solution.

SUMMARY OF THE INVENTION

In the process of the invention this is accomplished in that the laden absorbent solution is pressure-relieved to an intermediate pressure in a stripping zone, which contains material exchange-promoting elements (e.g. plates, baffles or packing), the laden absorbent solution is stripped in the stripping zone with a gas that consists predominantly of CO$_2$ a gas mixture which consists of pressure-relief liberated gas and stripping gas and contains valuable gas is withdrawn from the stripping zone, and the absorbent solution is pressure-relieved further in a succeeding pressure-relief zone from which is liberated gas consisting predominantly of CO$_2$ is withdrawn.

The stripping gas which is fed to the stripping zone and consists predominantly of CO$_2$ may come entirely or in part from an extraneous gas source.

It may be desirable, however, to supply the stripping zone for that purpose with all or part of the gas which has been liberated in the succeeding pressure-relief zone.

The stripping zone is desirably preceded by a pressure relief zone, which is supplied with the laden absorbent solution from the scrubbing zone and in which the absorbent solution is pressure-relieved to a first intermediate pressure.

The absorbent solution then enters the stripping zone. While part of the valuable gases and some CO$_2$ are released in the preceding pressure relief zone, the absorbent solution which is fed to the stripping zone still has a substantial CO$_2$ content. In this case the pressure in the stripping zone is suitably so selected that the absorbent solution is almost fully saturated with CO$_2$ in that zone so that CO$_2$ can be absorbed only at a low rate from the stripping gas by the absorbent solution and CO$_2$ at a relatively high rate becomes effective as a stripping gas.

A natural gas to be purified in the scrubbing zone will contain valuable gases consisting of methane and higher hydrocarbons. A synthesis gas to be purified will contain valuable gases consisting of hydrogen and carbon monoxide. But the process is not restricted to gases of these two types and may be applied to gases of other types as well.

BRIEF DESCRIPTION OF THE DRAWING

The above and other objects, features and advantages of our invention will become more readily apparent from the following description, reference being made to the accompanying highly diagrammatic drawing.

The sole FIGURE is a flow diagram illustrating the process.

SUMMARY OF THE INVENTION

The raw gas to be treated is supplied by line 1 to the scrubbing zone 2, which is fed at its top with regenerated absorbent solutin via line 3.

The raw gas contains at least one valuable gas constituent, such as CH$_4$, H$_2$ or CO, and also contains at least CO$_2$ as an impurity.

At least part of said CO$_2$ is removed from the gas mixture by the absorbent solution in the scrubbing zone 2, in which a pressure is maintained which usually lies in the range from 5 to 100 bars and preferably lies in the range from 15 to 80 bars. The pure gas is withdrawn in line 4.

A used laden absorbent solution at a temperature in the range from $+60°$ to $-80°$ C. is fed by line 6 to a first pressure-relief zone 7, in which the absorbent solution is sufficiently pressure-relieved to liberate a gas which contains 5 to 80% valuable gases. That liberated gas is fed by line 8 through a throttle valve 9 and by line 10 to a second scrubbing zone 11, which is supplied from line 12 with regenerated absorbent solution for sufficiently absorbing particularly the CO$_2$ from the gas mixture which has been received. The remaining gases consist mainly of the valuable gases and are recycled by means of the compressor 13 via line 14 to the first scrubbing zone 2.

The absorbent solution which has left the first pressure relief stage 7 and the laden absorbent solution which has left the second scrubbing zone 11 and is conducted by line 17 are jointly fed by line 16 to the stripping zone 20, in which a partial pressure-relief is effected to an intermediate pressure.

That stripping zone contains material-exchange-promoting elements 21 (shown in broken lines), such as plates or packing elements known per se.

The high-CO$_2$ flashed-off gas from line 22 is fed to the lower portion of the stripping zone 20 and in the stripping zone acts as a stripping gas. In addition or as an alternative, a high-CO$_2$ gas may be supplied from an extraneous source by a line 24, which is indicated in dotted lines.

A gas mixture is withdrawn from the top of the stripping zone 20 and is fed by line 23 also to the second scrubbing zone 11.

The preceding pressure-relief zone 7 may alternatively be omitted, particularly if the valuable gas loading of the absorbent leaving the scrubbing zone 2 is low relative to its $CO_2$ loading. In that case the laden absorbent solution in line 6 is fed directly to the stripping zone 20 together with the absorbent solution from line 17.

The absorbent solution which has been treated in the stripping zone 20 is fed by line 25 to a succeeding pressure-relief zone 26.

The absorbent solution in line 25 contains $CO_2$ and has only small residual contents of valuable gases. The valuable gas content of that absorbent solution is not in excess of 10% and preferably not in excess of 5% of the valuable gas content of the absorbent solution in line 6.

The gas which has been liberated as a result of the pressure-relief in the pressure-relief zone 26 consists predominantly of $CO_2$ is withdrawn and is fed to the stripping zone 20 in line 22 by the compressor 27.

If the absorbent solution which is withdrawn in line 30 has not yet sufficiently been regenerated, it will be aftertreated in a regenerator 31. This may be effected by the conventional regenerating treatments known per se, namely, pressure-relief, stripping and/or hot regeneration. The regenerated absorbent solution is recycled in lines 3 and 12 to the scrubbing zones 2 and 11.

If the regenerator 31 is omitted, the absorbent solution from line 30 is recycled to the two absorbent zone 2, 11.

SPECIFIC EXAMPLE

In an embodiment of the process shown in the drawing, but without the second scrubbing zone 11, the scrubbing zone 2 is supplied with mixed gases consisting of methane ($CH_4$) and $CO_2$ at a rate of 2232 kilomoles/h each.

The $CO_2$ is sufficiently removed under a pressure of 70 bars by a treatment with an NMP absorbent solution, which contains 204 kilomoles $CO_2$ per hour as it is supplied in line 3 at a rate of 565 $M^3$/h and which is at a temperature of 27° C. as it leaves the scrubbing zone in line 6. The pressure is about 30 bars in the pressure relief zone 7, about 20 bars in the stripping zone 20 and about 15 bars in the pressure relief zone 26.

The absorbent solutions in lines 6, 16, 25 and 30 contain $CO_2$ and $CH_4$ at the following rates in kilomoles/h:

|        | 6    | 16   | 25   | 30   |
|--------|------|------|------|------|
| $CO_2$ | 2356 | 2107 | 2154 | 1662 |
| $CH_4$ | 170  | 49   | 0.52 | 0.02 |

The gas mixtures in lines 4, 8, 23 and 22 consist of $CO_2$ and $CH_4$ and contain $CO_2$ and $CH_4$ at the following rates in kilomoles/h:

|        | 4    | 8   | 23    | 22  |
|--------|------|-----|-------|-----|
| $CO_2$ | 80   | 249 | 445   | 492 |
| $CH_4$ | 2062 | 121 | 48.98 | 0.5 |

It is apparent that the methane which is missing in the purified gas conducted in line 4 has been almost entirely recovered in the gas mixtures conducted in lines 8 and 23.

We claim:

1. A process for treating a laden absorbent solution withdrawn from a scrubbing zone in which said solution had been under a pressure of at least 5 bars and in direct contact with a scrubbed gas which contains $CO_2$ and at least one valuable gas selected from the group which consists of methane, hydrogen and carbon monoxide so that the laden absorbent solution has absorbed $CO_2$ and said valuable gas by physical dissolution thereof in the absorbent solution, said process comprising the steps of:
   (a) pressure-relieving said laden absorbent solution to an intermediate pressure in a stripping zone which contains material-exchange-promoting elements;
   (b) stripping the pressure-relieved laden absorbent at said intermediate pressure in said stripping zone with a stripping gas consisting predominantly of $CO_2$ to form a gas mixture consisting of liberated gas formed by pressure relief and said stripping gas and containing said valuable gas;
   (c) withdrawing said gas mixture consisting of liberated gas formed by pressure relief and said stripping gas and containing said valuable gas from said stripping zone;
   (d) thereafter pressure-relieving said absorbent further in a pressure-relief zone to liberate a gas consisting predominantly of $CO_2$; and
   (e) withdrawing from said pressure-relief zone said gas consisting predominantly of $CO_2$.

2. The process defined in claim 1, further comprising the steps of:
   pressure-relieveing the absorbent solution to a first intermediate pressure prior to step (a), in a first pressure-relief zone upstream of said stripping zone to liberate a first gas;
   withdrawing said first gas from said first presssure-relief zone; and
   thereafter feeding the absorbent solution from said first pressure-relief zone to said stripping zone, and pressure-relieving it therein to a second intermediate pressure.

3. The process defined in claim 1, further comprising the steps of:
   treating said gas mixture withdrawn from said stripping zone in a second scrubbing zone with a physically acting absorbent solution to remove at least part of the $CO_2$ content thereof;
   withdrawing a treated gas from said second scrubbing zone; and
   feeding a second laden absorbent from said second scrubbing zone to said stripping zone.

4. The process defined in claim 1, further comprising the step of feeding at least part of the gas liberated in step (d) to said stripping zone.

5. The process defined in claim 1, further comprising the steps of:
   pressure-relieving the laden absorbent solution to a first intermediate pressure prior to step (a), in a first pressure-relief zone upstream of said stripping zone to liberate a first gas;
   withdrawing said first gas from said first pressure-relief zone;
   thereafter feeding the absorbent solution from said first pressure-relief zone to said stripping zone;
   treating the first gas in a second scrubbing zone with a physically acting absorbent solution to remove at least part of the $CO_2$ content thereof;
   withdrawing a treated gas from said second scrubbing zone; and
   feeding a laden absorbent from said second scrubbing zone to said stripping zone.

* * * * *